(12) United States Patent
Hung et al.

(10) Patent No.: US 7,971,790 B2
(45) Date of Patent: Jul. 5, 2011

(54) LASER POINTER WITH CONTROLLABLE PATTERN AND SIZE OF PROJECTED IMAGE

(75) Inventors: Chang-Li Hung, Taipei (TW);
Feng-Chun Yeh, Taipei (TW);
Tsun-Hsiang Cheng, Taipei (TW)

(73) Assignee: Opus Microsystems Corporation, Taipei (TW)

( * ) Notice: Subject to any disclaimer, the term of this patent is extended or adjusted under 35 U.S.C. 154(b) by 340 days.

(21) Appl. No.: 12/246,917

(22) Filed: Oct. 7, 2008

(65) Prior Publication Data

US 2009/0092161 A1 Apr. 9, 2009

(30) Foreign Application Priority Data

Oct. 8, 2007 (TW) .............................. 96137725 A

(51) Int. Cl.
*G06K 7/10* (2006.01)
*G06K 7/14* (2006.01)

(52) U.S. Cl. ..................... 235/454; 235/455; 235/462.2; 235/462.21; 235/462.26; 235/462.36; 235/462.38; 235/462.4; 235/462.45; 235/462.49; 235/472.01; 235/472.02; 235/472.03; 353/42; 345/158; 362/109; 362/118; 362/259

(58) Field of Classification Search .................. 235/454, 235/455, 462.2, 462.21, 462.26, 462.36, 235/462.38, 462.4, 462.45, 462.49, 472.01–472.03; 353/42; 345/156, 158; 362/109, 118, 259

See application file for complete search history.

(56) References Cited

U.S. PATENT DOCUMENTS

| 6,275,214 | B1* | 8/2001 | Hansen | 345/158 |
| 6,323,839 | B1* | 11/2001 | Fukuda et al. | 345/157 |
| 7,683,881 | B2* | 3/2010 | Sun et al. | 345/156 |
| 2001/0045940 | A1* | 11/2001 | Hansen | 345/158 |
| 2003/0169233 | A1* | 9/2003 | Hansen | 345/158 |

* cited by examiner

*Primary Examiner* — Thien M. Le
*Assistant Examiner* — Tuyen K Vo
(74) *Attorney, Agent, or Firm* — Muncy, Geissler, Olds & Lowe, PLLC

(57) ABSTRACT

A laser pointer includes a human-machine interface disposed above the housing for users to control components inside the housing to decide patterns and size of the projecting image. The components consist of a frequency/phase control module, a driving energy control module, a laser beam generating module and a light scanning device. The frequency/phase control module controls the driving energy control module while the driving energy control module controls driving energy of the light scanning device. The size of the image is controlled by change of the amplitude of the light scanning device while the amplitude is changed along with the driving energy. The amplitude may also change along with the driving frequency. When the driving energy is fixed and the driving frequency is close to the resonant frequency, the amplitude increases. On the contrary, the amplitude decreases.

10 Claims, 7 Drawing Sheets

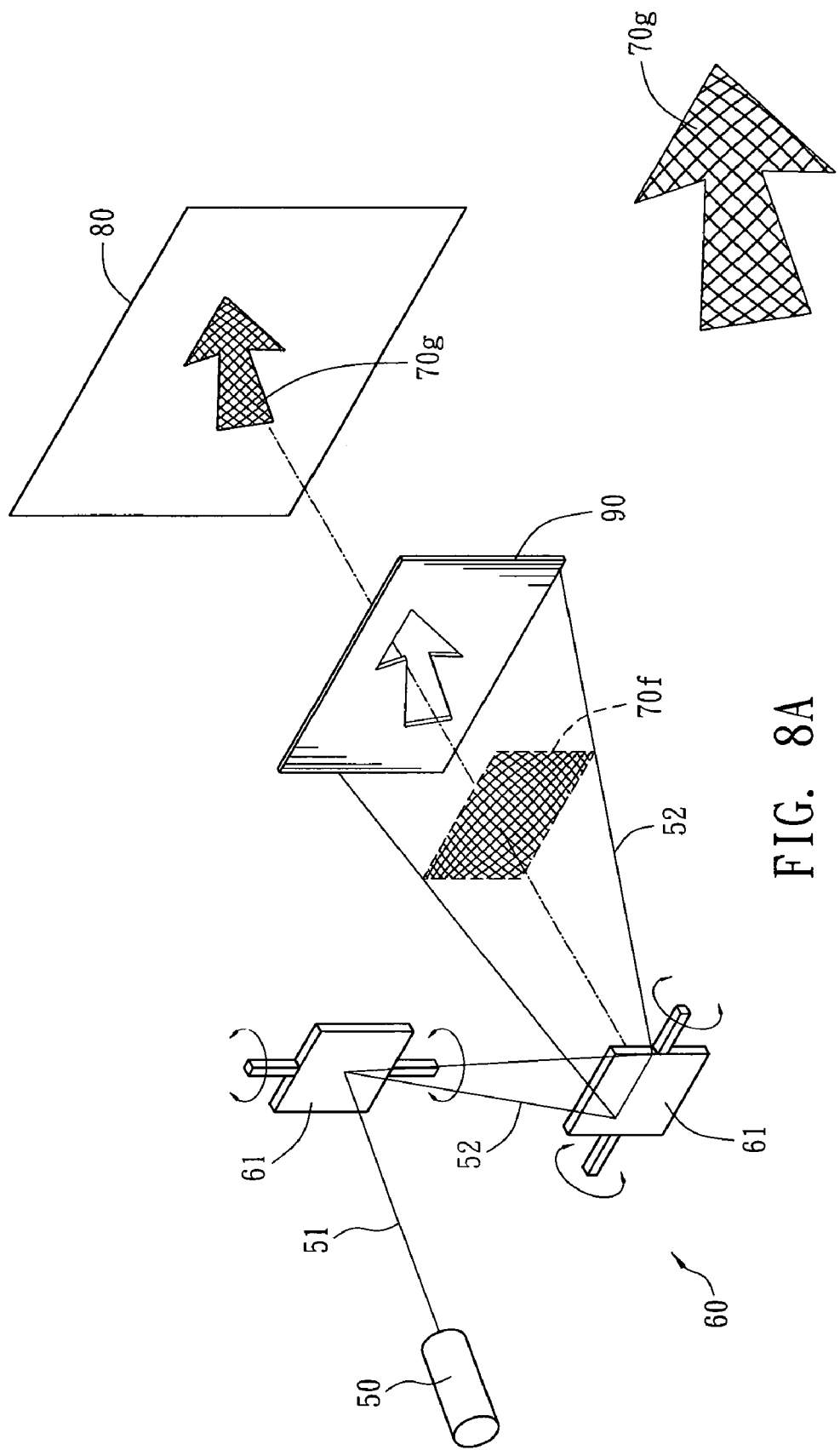

LASER POINTER WITH CONTROLLABLE PATTERN AND SIZE OF PROJECTED IMAGE

BACKGROUND OF THE INVENTION

The present invention relates to a laser pointer, especially to a laser pointer that projects a single point, a line with controllable length, or an ellipse image, a circle image or an image of other patterns such as Lissajous pattern with controllable pattern and size just in time.

Now laser pointers available on the market project a single spot. Users take the laser pointer to emit a laser beam that forms a laser spot as an indicator. However, the single spot is unable to cover a certain range of information so that the user needs to wave (or shake) the laser point for indicating or emphasizing certain area of the image or part of the object. By movement of the laser spot, a certain area is indicated. Yet such movement is difficult to make the laser spot fall on the position required precisely and cause inconvenience of users. Although such waving may draw audiences' attention, the accuracy of the indication is poor and the audience may have bad feelings.

In order to overcome the above disadvantages of the conventional laser pointer with single spot, some non-spot laser pointers are available now. Refer to U.S. Pat. No. 5,450,148, a laser pointer is disposed with a cylindrical lens so as to project a linear image instead of a single spot but the length of the linear image is unable to be adjusted. Refer to U.S. Pat. No. 5,938,308, a laser pointer is disposed with a holographic element or a diffractive optical element so as to project non-spot laser images. By change of the holographic element, a different laser image is projected. Yet by the diffractive optical element, size of the laser image is unable to be changed according to the user's needs. Thus when the laser image is unable to label or cover a certain area, the user still need to wave his hand for emphasis. Moreover, although the pattern of the image projected by the diffractive optical element can be changed, the size is still fixed. Furthermore, the laser pointer with the diffractive optical element has other problems such as low optical efficiency and manufacturing difficulties that have negative effects on the applications.

SUMMARY OF THE INVENTION

Therefore it is a primary object of the present invention to provide a laser pointer that includes a housing, a human-machine interface arranged on outer surface of the housing, a frequency/phase control module, a driving energy control module, a laser beam generating module and a light scanning device. The modules and the light scanning device are mounted inside the housing. The frequency/phase control module is for control of the driving energy control module, the driving energy control module is for control of the driving energy of the light scanning device and the laser beam generating module is for generating laser beams. The light scanning device formed by at least one one-dimensional light scanning mirror or one two-dimensional light scanning mirror is used to turn a laser beam into a scanning light beam according to a scanning module set by the human-machine interface and then the scanning light projects through a projection window on the housing onto a projection plane to form an image. The size of the image is adjusted and controlled by change of the amplitude (or scanning angle) of the light scanning device while the amplitude changes along with the decreasing or increasing driving energy. The amplitude is also affected by change of the driving frequency that is close to or far away from the resonant frequency of the light scanning device. When the driving energy is fixed and the driving energy is close to the resonant frequency, the amplitude (or scanning angle) increases. On the contrary, the amplitude decreases. Thus by push buttons or rotary switches on the human-machine interface, users can choose to project a single spot, a line with controllable length, or an ellipse image, a circle image or images of other patterns such as Lissajous pattern with controllable size so as to improved the efficiency of the laser pointer.

It is another object of the present invention to provide a laser pointer that includes a light scanning device formed by two 1D light scanning mirror or one 2D light scanning mirrors. The light scanning device makes the projected scanning light beam become into an image in Lissajous pattern with controllable size and intense scanning light beams so as to provide a certain range of lighting. Thus the laser pointer can also be used as a flashlight with controllable lighting range.

It is a further object of the present invention to provide a laser pointer that is disposed with a plate having a specific hollow pattern such as an arrow over a projection window of the laser pointer. Thus when the laser pointer projects an image in Lissajous pattern with controllable size and intense scanning light beams, the light passes through the plate so that an image in the specific pattern and with intense scanning light beams is projected. The variability and selectivity of the projected images are increased. Furthermore, the plate with various hollow patterns is produced in low cost. Thus the manufacturing cost of the laser pointer is reduced while the efficiency and prevalence of the laser pointer are improved.

BRIEF DESCRIPTION OF THE DRAWINGS

FIG. 8A is a schematic drawing showing the Lissajous pattern image in FIG. 7A passing a plate with specific hollow pattern;

FIG. 8B is a front view of the image in the specific pattern in FIG. 8A;

DETAILED DESCRIPTION OF THE PREFERRED EMBODIMENT

Figure 1:
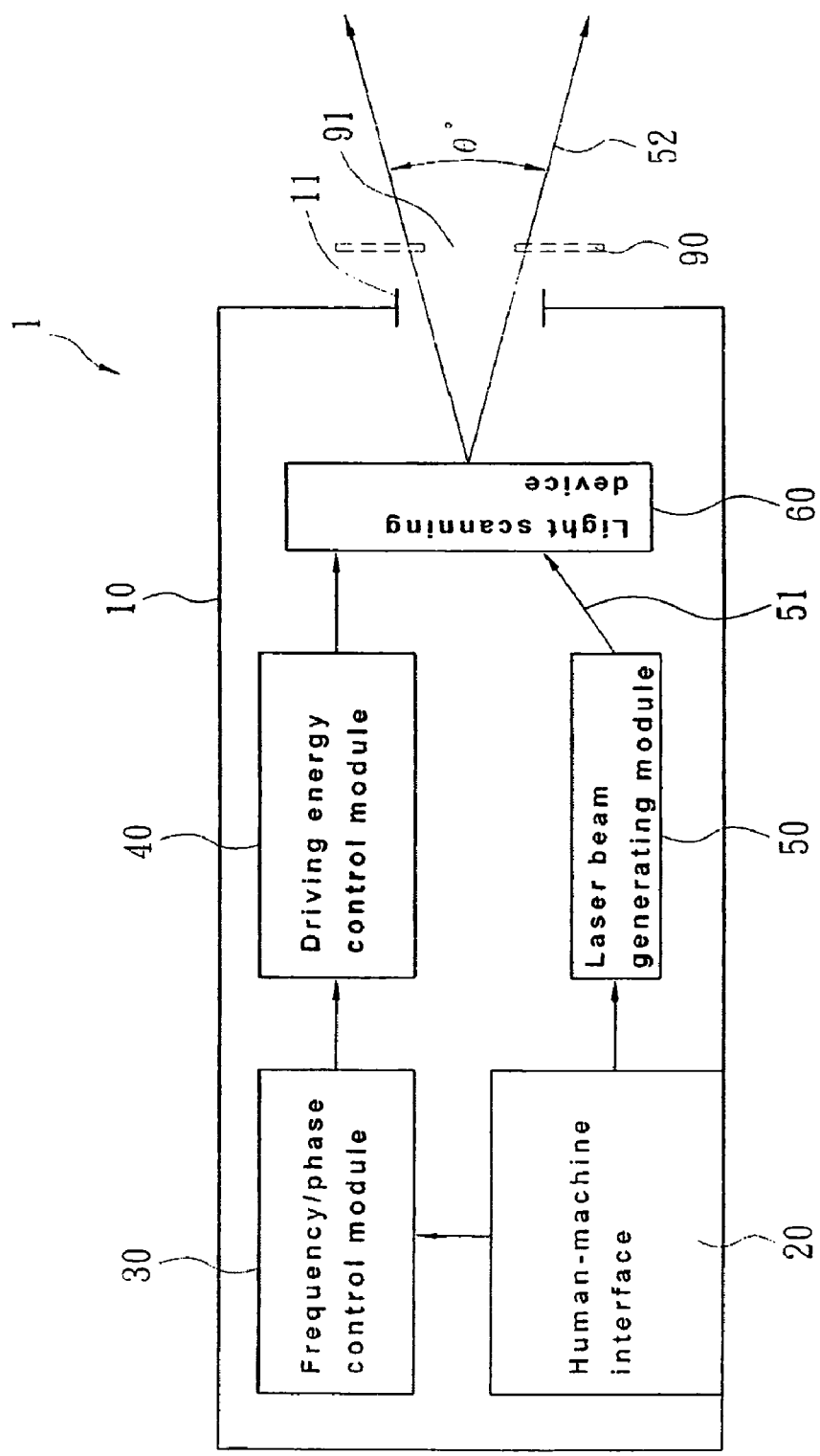
FIG. 1 is a schematic drawing showing a system structure of an embodiment according to the present invention.

Refer to FIG. 1, a laser pointer 1 according to the present invention mainly consists of a housing 10, a human-machine interface 20, a frequency/phase control module 30, a driving energy control module 40, a laser beam generating module 50 and a light scanning device 60. There is no limit on style and structure of the housing 10. A projection window 11 is arranged on the housing so that scanning light beams can emit outwards. The human-machine interface 20 is disposed above the housing 10 and it can be designed as a push button or rotary switch for users to operate the laser pointer 1. The frequency/phase control module 30, the driving energy control module 40, the laser beam generating module 50 and the light scanning device 60 are mounted inside the housing 10 and the way of disposition these components is not restricted, as far as the laser pointer 1 can be compact, light-weight and easy to be operated for users. By the human-machine interface 20, the driving mode of the frequency/phase control module 30 such as frequency or phase difference can be changed. Furthermore, the energy driving pattern of the driving energy control module 40 as well as the light scanning device 60 is also controlled. For example, once the driving energy is changed, scanning modes of the light scanning device 60 such as amplitude (or scanning angle) of a 1-dimensional (1D) light scanning mirror 61 or a 2-dimensional (2D) light scanning mirror 62 is also changed. The laser beam generating module 50 includes at least one laser source and controls generating modes of a laser beam 51. According to a scanning mode of the light scanning device 60, the laser beam 51 is scanned and turned into a scanning light beam 52 that projects through the projection window 11 to form an image with controllable size or pattern on a projection plane.

Figure 3:
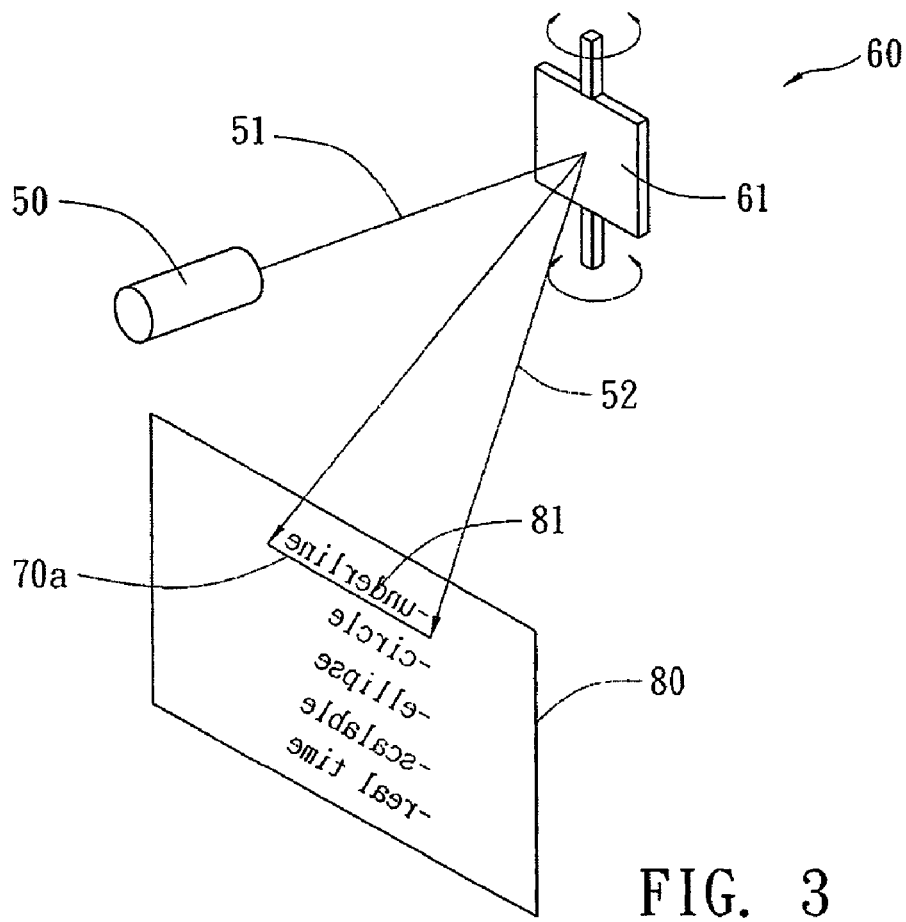
FIG. 3 is a schematic drawing showing a line with controllable length projected by a 1-dimensional-swing light scanning mirror according to the present invention.
Figure 4:
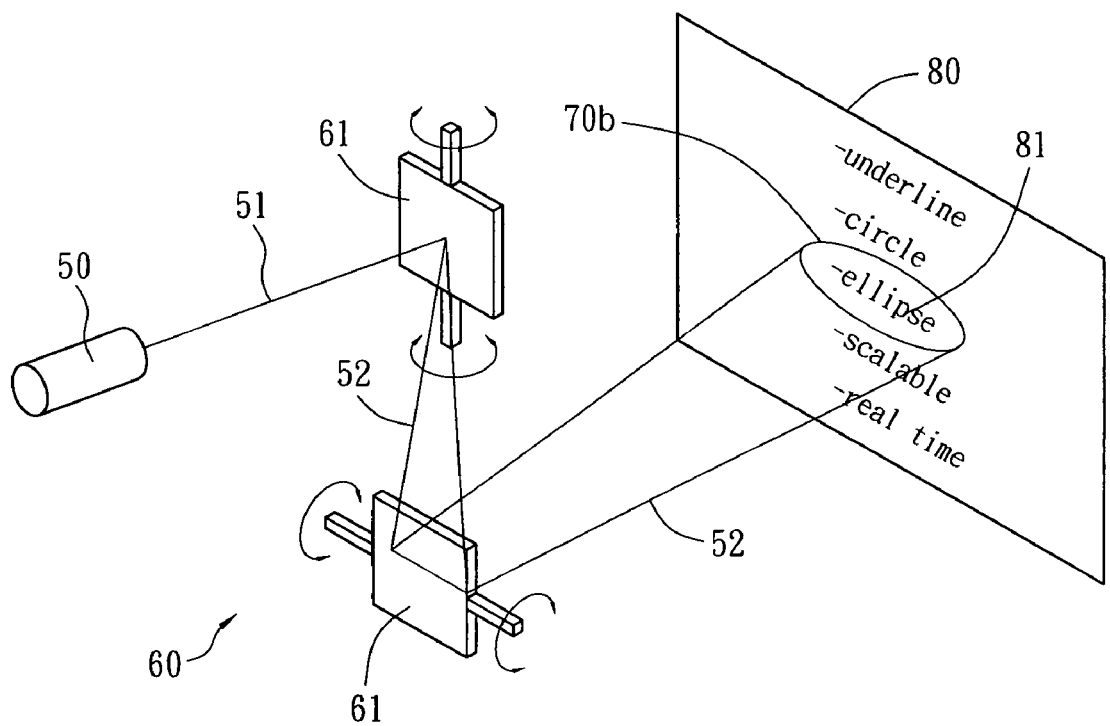
FIG. 4 shows an ellipse image with controllable size projected by two 1-dimensional-swing light scanning mirrors according to the present invention.

There is no restriction on structure of the light scanning device 60. The structure of numbers of the light scanning mirror of the light scanning device 60 varies according to different designs or functions of the laser pointer 1. For example, the light scanning device 60 may include a moving axis, as shown in FIG. 3, two moving axes, as shown in FIG. 4, or refer to FIG. 5, two moving axes that cross with each other. The light scanning mirror 61/62 is a MEMS oscillating mirror formed by the micro-electronic mechanical system (MEMS) technique available now.

Figure 5:
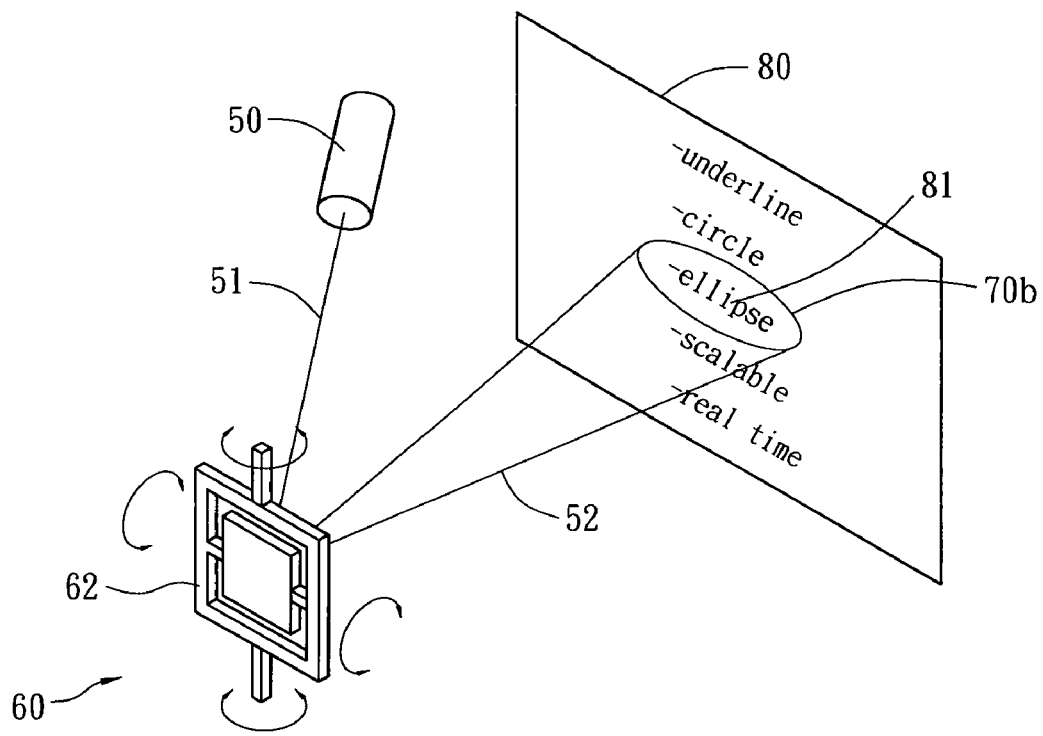
FIG. 5 shows an ellipse image with controllable size projected by a 2-dimensional-swing light scanning mirror according to the present invention.

The light scanning device 60 of the laser pointer 1 is formed by various light scanning mirrors 61/62 for projecting various patterns according to users' needs. For example, once a 1D light scanning mirror 61 is used, a single spot (not shown in figure) or a line with controllable length is projected, as shown in FIG. 3. Or by means of two 1D light scanning mirrors 61, or a 2D light scanning mirror 62, a single spot, a line with controllable length, or various patterns such as ellipse, circle, or Lissajous pattern, as shown in FIG. 4, FIG. 5 & FIG. 7. The present invention features on that by control of the human-machine interface 20, user can select the pattern or size of the projecting images, as shown from FIG. 3 to FIG. 7. Thus the efficiency and the selectivity of the laser pointer 1 are improved.

Figure 2:
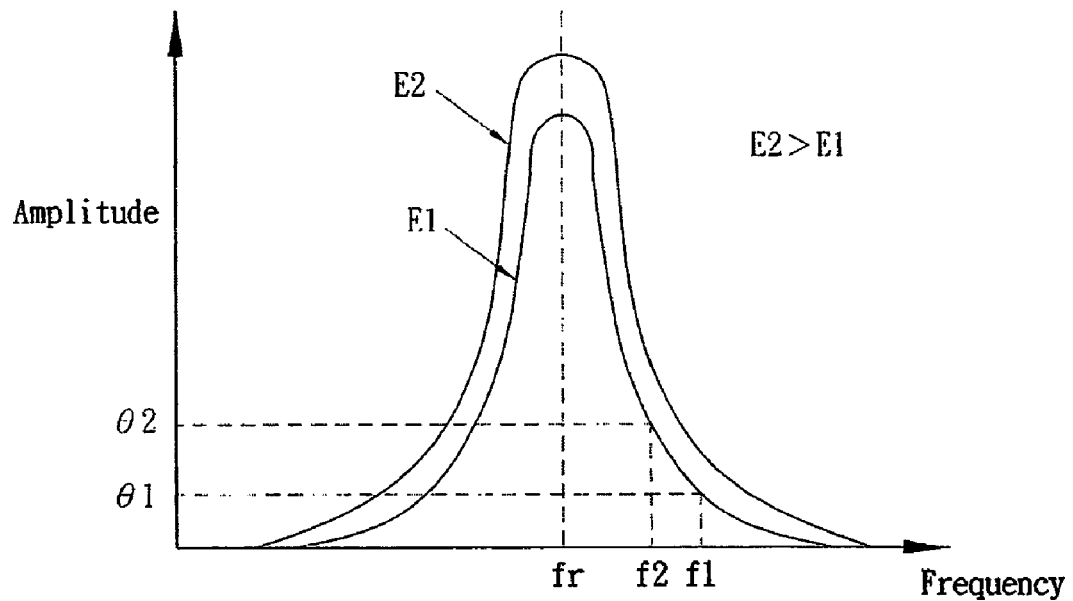
FIG. 2 is a curve showing relationship between the amplitude and the scanning frequency of a light scanning device according to the present invention.

Refer to FIG. 2, resonant frequency fr is the move frequency of the light scanning mirror at maximum amplitude with fixed driving energy. E1 represents a first driving energy and E2 is a second driving energy while E2 is larger than E1. f1 is a first driving frequency and f2 is a second driving frequency wherein f2 is more close to the resonant frequency fr than f1. θ1, θ2 respectively represents scanning angle of the light scanning mirror under the condition of E1, f1 and E2, f2. The relationship among the amplitude, the driving frequency and the driving energy of a light scanning mirror. For example, at fixed move frequency, the light scanning mirror with higher driving energy has higher amplitude. Moreover, with fixed driving energy, when the move frequency of the light scanning mirror is more close to the resonant frequency fr, its amplitude (or scanning angle) is getting larger.

At fixed move frequency, the relationship between the scanning angle of the light scanning mirror and time is defined by the following equation:

$$\theta = \theta_o * \sin(2\pi f * t).$$

wherein f is the frequency of the light scanning mirror, $\theta_o$ is maximum amplitude of the light scanning mirror at fixed driving energy and the fixed move frequency. Refer to FIG. 4 & FIG. 5, when the laser beam 51 is reflected by the 1D light scanning mirrors 61 with two moving axes that cross with each other, or one 2D light scanning mirror 62, the movement of the scanning light beam 52 is defined by the following equation:

$$\Theta x = \theta_x * \sin(2\pi fx * t).$$

$$\Theta y = \theta_y * \sin(2\pi fy * t + \Phi)$$

wherein $\theta_x$ is the maximum scanning angle in the X axis (horizontal direction), $\Theta x$ is X-component of the reflected scanning light beam, fx is the move frequency on the horizontal axis; $\theta_y$ is the maximum scanning angle in the Y axis (vertical direction), $\Theta y$ is Y-component of the reflected scanning light beam, fy is the move frequency on the vertical axis, $\Phi$ is phase difference between the two axes.

It is found that when parameters of the above two scanning axes such as amplitude, frequency or phase difference have been changed by control of the human-machine interface 20, the movement pattern of the scanning light beam 52 also changes so that images with various patterns are projected. The details are as followings:

(1) When both of the two moving axes have no movement, a single spot is projected.

Figure 9:
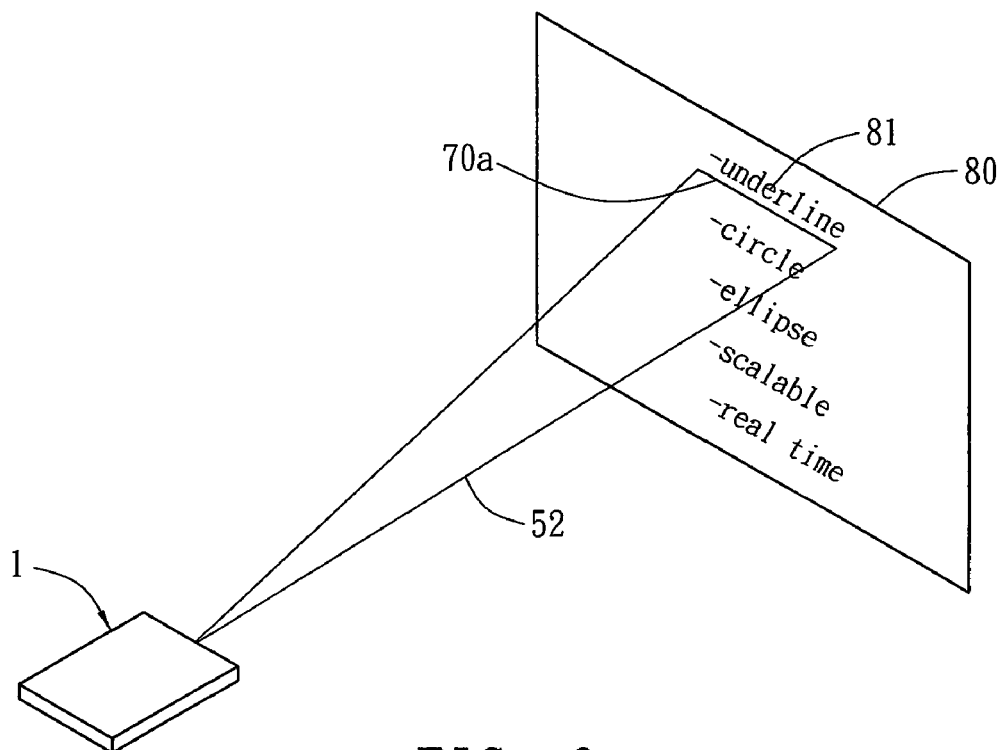
FIG. 9 is a schematic drawing showing a line projected by the present invention.
Figure 10:
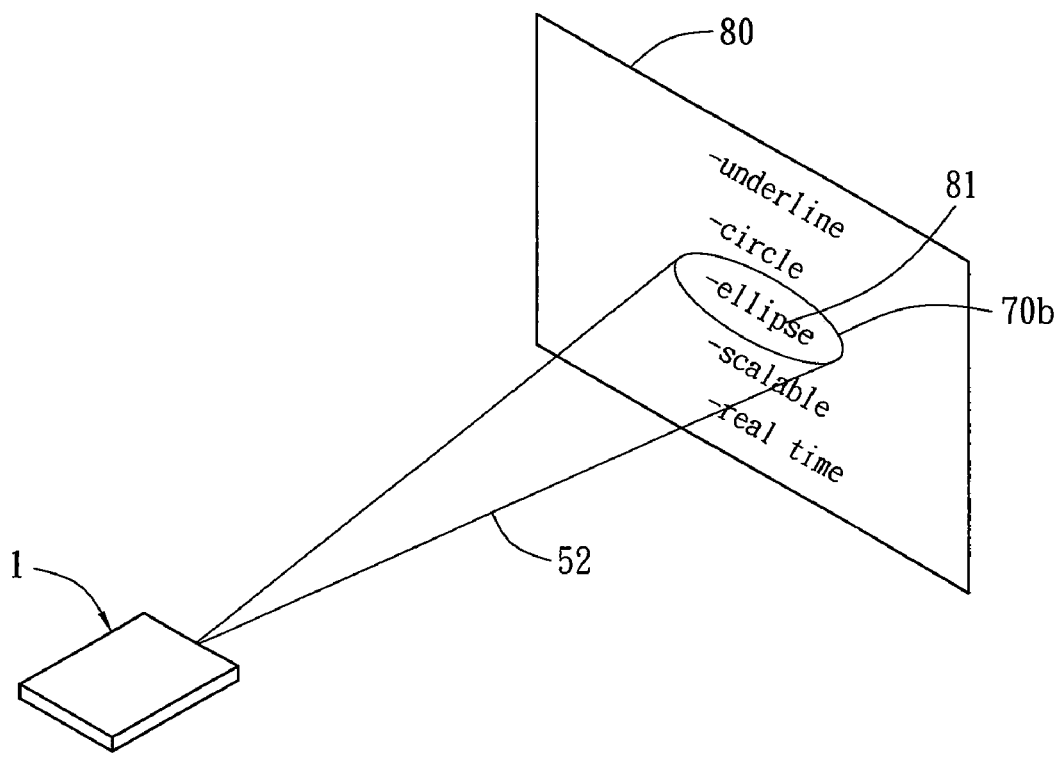
FIG. 10 is a schematic drawing showing an ellipse projected by the present invention.

(2) When only the vertical moving axis (Y axis) moves, a linear image 70a is projected, as shown in FIG. 3 & FIG. 9. According to users needs, the amplitude (or scanning angle) of the vertical moving axis (Y axis) is changed by the human-machine interface 20 so as to adjust the length of the line in time.

Figure 6A:
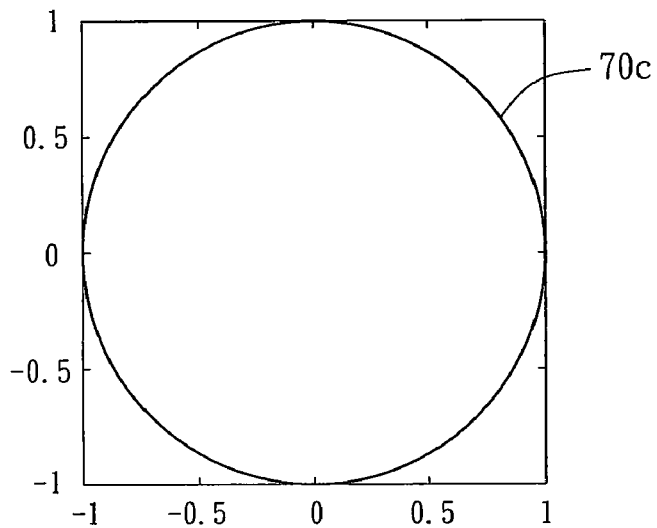
FIG. 6A is a schematic drawing showing a circle image projected by the present invention.

(3) When the above two moving axes have the same amplitude as well as move frequency ($\Theta x = \Theta y$, fx=fy) and the phase difference $\Phi$ between them is 90 degrees, a circle image 70c is projected, as shown in FIG. 6A. The size of the circle image 70c is under control of the human-machine interface 20.

Figure 6B:
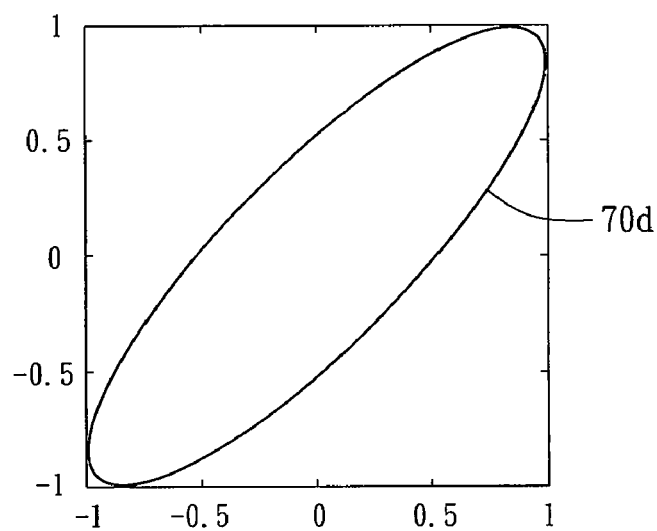
FIG. 6B is a schematic drawing showing a tilted ellipse image projected by the present invention.

(4) When the amplitude as well as the move frequency of the two moving axes is the same ($\Theta x = \Theta y$, fx=fy) and the phase difference $\Phi$ between them is 30 degrees, a tilted ellipse image 70d is projected, as shown in FIG. 6B. The size or ratio of length to width of the tilted ellipse image 70d is controlled by the human-machine interface 20.

Figure 6C:
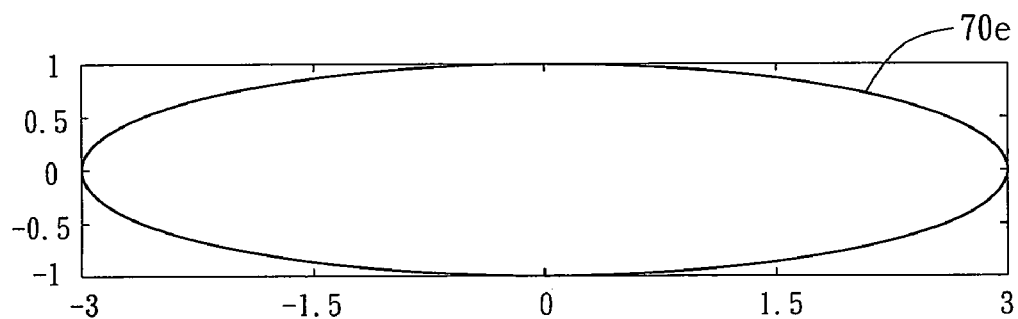
FIG. 6C is a schematic drawing showing an ellipse image projected by the present invention.

(5) When the two axes have different amplitude such that the amplitude of the X axis is three times of that of the Y axis, the same move frequency and the phase difference $\Phi$ between them is 90 degrees ($\Theta x \neq \Theta y$, fx=fy), an ellipse image 70e is projected, as shown in FIG. 6C. The size of the ellipse image 70e can be changed by the human-machine interface 20.

Figures 7A, 7B:
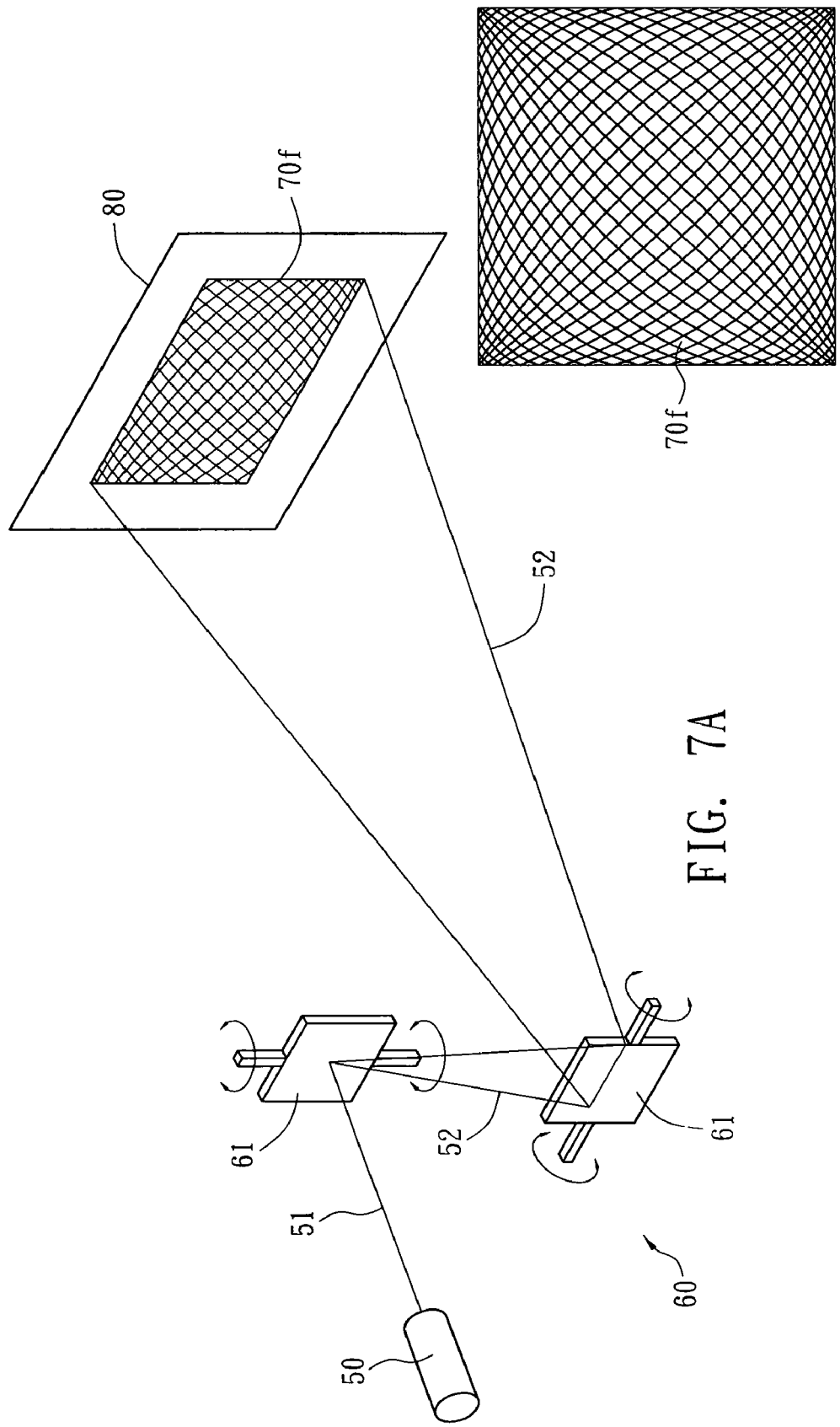
FIG. 7A is a schematic drawing showing a Lissajous pattern image projected by the present invention.
FIG. 7B is a front view of the Lissajous pattern image in FIG. 7A.

(7) When the phase difference between the two axes is fixed while the move frequency is a bit different, fx≈fy, an intense scanning light beam is projected, such as a 2-dimensional Lissajous pattern 70f in FIG. 7A & FIG. 7B formed by crossed and intense scanning light beams. The size of the Lissajous pattern 70f is under control of the human-machine interface 20. Because the Lissajous pattern 70f is a grid image formed by intense scanning light beams in FIG. 7B, and the image looks like a bright area provided by a flashlight so that the laser pointer 1 can also be used as a flashlight with controllable lighting range.

It is learned that data in FIG. 2 can be used as reference values for setting the human-machine interface 20. Through the frequency/phase control module 30, the driving energy control module 40, the amplitude, the frequency and the phase of each light scanning mirror (61/62) of the light scanning device 60 is controlled by the human-machine interface 20 and the laser beam 51 generated by the laser beam generating module 50 is turned into the scanning light beam 52 by the light scanning device 60 in a selected scanning mode. That means the pattern or size of the images projected by the laser pointer 1 of the present invention is controllable by change of the amplitude (or scanning angle θ) of the light scanning device 60 while the amplitude (or scanning angle θ) is changed along with increasing or decreasing of the driving energy that is controlled by the driving energy control module 40. Or the amplitude (or scanning angle θ) may change along with the driving frequency that is controlled by the frequency/phase control module 30. The driving frequency is closed to or far away from the resonant frequency (fr) of each light scanning mirror 61/62 under the control of the frequency/phase control module 30. When the driving energy is fixed (such as E1 or E2 in FIG. 2) while the driving frequency (such as f1 or f2 in FIG. 2) is close to the resonant frequency (fr), the amplitude (or scanning angle θ) increases. On the contrary, the amplitude (or scanning angle θ) decreases. Thus by the human-machine interface 20, users choose to project a light spot, a line with controllable length (in FIG. 3), an image with controllable pattern such as an eclipse, a round or Lissajous pattern (as shown in FIG. 4 & FIG. 5) they need. Therefore, the efficiency of the laser pointer 1 is improved.

The First Embodiment

Refer to FIG. 3, the laser beam 51 passes a vertical moving axis of a light scanning mirror 61, being scanned at a certain amplitude into a scanning light beam 52 that projects to form a line image 70a. By controlling the amplitude (or scanning angle θ) of the light scanning mirror 61, the length of the line image 70a is adjusted so that the line image 70a changes according to the range of an indicated target 81 on a projection screen (or object) 80. The amplitude (or scanning angle θ) of the light scanning mirror 61 is controlled by the human-machine interface 20 through the frequency/phase control module 30 as well as the driving energy control module 40.

The Second Embodiment

Refer to FIG. 4, by means of two 1D light scanning mirrors 61, an ellipse image 70b is projected. The size (semi-minor axis and semi-major axis) of the ellipse is adjusted according to the amplitude (or the scanning angle θ) of the two light scanning mirrors 61. Furthermore, the amplitude (or the scanning angle θ) of the two light scanning mirrors 61 can be respectively controlled by the human-machine interface 20.

The Third Embodiment

Refer to FIG. 5, an ellipse image 70b is projected by means of a 2D light scanning mirror 62. The size or ratio of the semi-minor axis to the semi-major axis of the ellipse image 70b is adjusted according to the amplitude (or the scanning angle θ) of the two moving axes of the light scanning mirror 62 while the amplitude (or the scanning angle θ) of the two moving axes of the light scanning mirror 62 is under control of the human-machine interface 20.

In the second and the third embodiments, the size or ratio of the semi-minor axis to the semi-major axis of the ellipse image 70b varies along with the change of the amplitude (or the scanning angle θ), the frequency and the phase difference of the two crossed moving axes of the two 1D light scanning mirrors 61 or the one 2D light scanning mirror 62. Thus the scanning light beam 52 projects a circle image 70c in FIG. 6A, or various ellipses 70d, 70e in FIG. 6B, FIG. 6C. The change of the amplitude (or the scanning angle θ), the frequency and the phase difference is under control of the human-machine interface 20. For example, the human-machine interface 20 includes three push buttons or rotary switches that respectively regulate the amplitude (or the scanning angle θ), the frequency and the phase difference. Thus users can adjust or change the amplitude (or the scanning angle θ), the frequency and the phase difference by operating the three push buttons or rotary switches so as to modify patterns or sizes of the projected image.

The Fourth Embodiment

Refer to FIG. 7A & FIG. 7B, use two 1D light scanning mirrors 61 to project an image in Lissajous pattern 70f. In this embodiment, the two moving axes have the same amplitude, the phase difference is 90 degrees, the frequency ratio of X axis/Y axis is 1.05. The 2D Lissajous pattern image 70f is distributed with intense scanning light beams so that the image 70f looks like lighting area provided by a flashlight. Therefore, the laser pointer 1 of the preset invention can be used as a flashlight with controllable lighting range.

The Fifth Embodiment

Refer to FIG. 8A & FIG. 8B, a plate 90 disposed with a specific hollow pattern 91 is used. As shown in figure, the pattern 91 is an arrow. Set the plate 90 over the projection window 11 of the housing 10, as shown in FIG. 1, then the image in Lissajous pattern 70f passes through the hollow pattern 91 of the plate 90 so that an image 70g in the specific pattern 91 and with intense scanning light beams is further projected. The variability and selectivity of the image projected by the laser pointer of the present invention are increased. The plate 90 with various designs is produced in low cost. Therefore, in low cost, the efficiency of the laser pointer is improved while the competitiveness as well as the prevalence is also increased.

Compared with conventional technique, a laser pointer 1 of the present invention has following advantages:

(1) By means of a 1D light scanning mirror, the present invention projects a line while the amplitude of the light scanning mirror can be changed by control of the driving energy or the frequency of the light scanning mirror. Thus the user can adjust the length of the line projected just in time and easily give a visual indication.

(2) The present invention may include two 1D light scanning mirrors. Besides functions mentioned in point (1), various patterns of images with controllable size can be projected by control the move frequency, the phase difference, and the amplitude of the two 1D light scanning mirrors so as to indicate a specific target on the projection screen.

(3) By control of the frequency difference between the two moving axes of the light scanning mirror, a changing image in Lissajous pattern formed by intense crossed scanning light beams is projected. The image looks like dynamic rotating animation and a lighting area provided by a flashlight. Moreover, when the Lissajous pattern image passes a plate with a specific hollow pattern, an image in the specific pattern and with intense scanning light beams is projected. It's easy and low-cost to produce the plate. Thus through the plate with various hollow patterns, various patterns of bright images are projected easily and conveniently so as to present variable effects.

(4) By means of a 2D light scanning mirror (62), the present invention achieves the same effect as mentioned in the point (2). The assembling is easier and the volume of the pointer is more compact.

(5) The laser pointer 1 of the present invention is portable and is convenient to operate. Moreover, the size or pattern of the projected images such as a single spot, a line with controllable length, an ellipse image, a circle image or an image in Lissajous pattern can be adjusted in time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A laser pointer with controllable patterns and sizes of projecting images comprising:
   a housing disposed with a projection window through which scanning light beams pass;
   a human-machine interface arranged on an outer surface of the housing for control of a frequency/phase control module, a driving energy control module, a laser beam generating module, and a light scanning device, as well as a pattern or size of images formed by projection of the scanning light beams;
   wherein the frequency/phase control module is mounted in the housing and, by means of the human-machine interface, driving modes having frequency and/or phase difference thereof are changed, the frequency/phase control module also being used to control the driving energy control module;
   wherein the driving energy control module is mounted in the housing and a driving energy mode thereof having a change of driving energy is controlled by the frequency/phase control module while the driving energy control module is used to control scanning modes of the light scanning device;
   wherein the laser beam generating module is mounted in the housing, modes of laser beams generated from the laser beam generating module are controlled by the human-machine interface, and the laser beam is projected to the light scanning device and turned into a scanning light beam according to the scanning mode of the light scanning device;
   wherein the light scanning device is mounted in the housing and formed by a one-dimensional light scanning mirror while the scanning modes of the light scanning device are controlled by the frequency/phase control module or the driving energy control module so as to make the laser beam become the scanning light beam that projects through the projection window to form an image;
   wherein the size of the image is controlled by changing an amplitude or scanning angle of the light scanning device;
   wherein the amplitude is changed by increasing or decreasing the driving energy or by changing the driving frequency that is close to or far away from the resonant frequency of the light scanning device; and
   wherein, under control of the human-machine interface, a single spot or a line with controllable length is projected just in time.

2. The laser pointer as claimed in claim 1, wherein the frequency/phase control module or the driving energy control module control the amplitude of the one-dimensional light scanning mirror.

3. A laser pointer with controllable patterns and sizes of projecting images comprising:
   a housing having a projection window through which scanning light beams pass;
   a human-machine interface arranged on an outer surface of the housing for control of a frequency/phase control module, a driving energy control module, a laser beam generating module, and a light scanning device, as well as a pattern or size of images formed by projection of the scanning light beams;
   wherein the frequency/phase control module is mounted in the housing and by means of the human-machine interface, driving modes having frequency and/or phase difference thereof are changed, the frequency/phase control module also being used to control the driving energy control module;
   wherein the driving energy control module is mounted in the housing and a driving energy mode thereof having a change of driving energy is controlled by the frequency/phase control module while the driving energy control module is used to control scanning modes of the light scanning device;
   wherein the laser beam generating module is mounted in the housing, modes of laser beams generated from the laser beam generating module are controlled by the human-machine interface, and the laser beam is projected to the light scanning device and turned into a scanning light beam according to the scanning mode of the light scanning device;
   wherein the light scanning device is mounted in the housing and formed by two one-dimensional light scanning mirrors or one two-dimensional light scanning mirror while the scanning modes of the light scanning device are controlled by the frequency/phase control module or the driving energy control module so as to make the laser beam become the scanning light beam that projects through the projection window to form an image;
   wherein the one-dimensional light scanning mirror is disposed with a moving axis and the two-dimensional light scanning mirror has two axes crossed with each other, the size of the image being controlled through the change of the amplitude or scanning angle of the light scanning device;
   wherein the amplitude is changed by increasing or decreasing the driving energy or by changing the driving frequency that is close to or far away from the resonant frequency of the light scanning device; and
   wherein, under control of the human-machine interface, a single spot or a line with controllable length, or an ellipse image, a circle image or an image of other patterns such as Lissajous pattern with controllable size is projected.

4. The laser pointer as claimed in claim 3, wherein one of the two moving axes is controlled to move for projecting a line and size of the line is controllable according to an amplitude of the moving axis under control of the human-machine interface.

5. The laser pointer as claimed in claim 3, wherein when the two moving axes have the same amplitude as well as the move frequency and the phase difference between the two axes is 90 degrees, a circle image is projected while size of the circle image is controllable according to an amplitude of the two moving axes under control of the human-machine interface.

6. The laser pointer as claimed in claim 3, wherein when the two moving axes have different amplitude and the same move frequency, an ellipse image is projected and size of the ellipse image is controllable according to an amplitude of the two moving axes under control of the human-machine interface.

7. The laser pointer as claimed in claim 3, wherein when the phase difference between the two axes is fixed while the move frequency of the two axes is different, a 2-dimensional image in Lissajous pattern with intense scanning light beams is projected while the size of the image in Lissajous pattern is controllable according to an amplitude of the two moving axes under control of the human-machine interface.

8. The laser pointer as claimed in claim 7, wherein a plate with a specific hollow pattern is disposed on a light path of the projected scanning light beam so that the 2-dimensional image in Lissajous pattern passes through the hollow pattern to project an image in the specific pattern and with intense scanning light beams.

9. The laser pointer as claimed in claim 8, wherein the plate is arranged over the projection window of the housing.

10. The laser pointer as claimed in claim 3, wherein the frequency/phase control module or the driving energy control module control the amplitude of the two one-dimensional light scanning mirrors or the one two-dimensional light scanning mirror.

\* \* \* \* \*